US010761497B2

(12) United States Patent
Bennett et al.

(10) Patent No.: US 10,761,497 B2
(45) Date of Patent: Sep. 1, 2020

(54) PRINTING 3D OBJECTS WITH AUTOMATIC DIMENSIONAL ACCURACY COMPENSATION

(71) Applicant: Microsoft Technology Licensing, LLC, Redmond, WA (US)

(72) Inventors: Teddy Ieland Bennett, Kirkland, WA (US); Gheorghe Marius Gheorghescu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 14/996,210

(22) Filed: Jan. 14, 2016

(65) Prior Publication Data

US 2017/0203515 A1    Jul. 20, 2017

(51) Int. Cl.
*B29C 67/00* (2017.01)
*G05B 15/02* (2006.01)
*B29C 64/393* (2017.01)
*B29C 64/106* (2017.01)
*B29C 64/232* (2017.01)
(Continued)

(52) U.S. Cl.
CPC ............ *G05B 15/02* (2013.01); *B29C 64/106* (2017.08); *B29C 64/232* (2017.08); *B29C 64/393* (2017.08); *B33Y 30/00* (2014.12); *B33Y 50/02* (2014.12)

(58) Field of Classification Search
CPC ... B29C 67/0088; B29C 64/386; B29C 64/00; G05B 15/02; B33Y 50/02; B33Y 30/00
See application file for complete search history.

(56) References Cited

U.S. PATENT DOCUMENTS 5,137,662 A * 8/1992 Hull ...................... G01J 1/4257
                                                 118/620
5,184,307 A * 2/1993 Hull ...................... G01J 1/4257
                                                 156/273.3
(Continued)

FOREIGN PATENT DOCUMENTS

EP         2599613 A2    6/2013
WO    WO 2001/072502 A1  10/2001

OTHER PUBLICATIONS

International Patent Application No. PCT/US2017/013080; Int'l Search Report and the Written Opinion; dated May 10, 2017; 13 pages.

(Continued)

*Primary Examiner* — Charles R Kasenge

(57) ABSTRACT

Techniques are described for improving dimensional accuracy, and more specifically z-axis or vertical dimensional accuracy in generating a 3 dimensional (3D) object comprising a plurality of formable layers. In one example, a height configuration parameter, such as a selected layer height, a print resolution, one or more tolerance values for certain layers or portions of a 3D object to be printed, etc., and a total object height, may be obtained. A first height corresponding to a subset of the plurality of formable layers may be selected based on the received height configuration parameter and the total object height. In some aspects, the first height may include a global layer height for the 3D object. The first height may be selected to optimize accuracy of the height configuration parameter or the total object height.

20 Claims, 11 Drawing Sheets

(51) Int. Cl.
    *B33Y 30/00*     (2015.01)
    *B33Y 50/02*     (2015.01)

(56) References Cited

U.S. PATENT DOCUMENTS

| | | | | |
|---|---|---|---|---|
| 5,345,391 | A * | 9/1994 | Hull | B29C 64/40 156/273.3 |
| 5,432,704 | A * | 7/1995 | Vouzelaud | G05B 19/4099 345/420 |
| 5,776,409 | A * | 7/1998 | Almquist | B29C 64/40 118/407 |
| 5,870,307 | A * | 2/1999 | Hull | G01J 1/4257 156/273.3 |
| 6,027,682 | A * | 2/2000 | Almquist | B29C 64/40 264/308 |
| 6,405,095 | B1 | 6/2002 | Jang | |
| 6,600,965 | B1 * | 7/2003 | Hull | G01J 1/4257 156/273.3 |
| 7,369,915 | B2 * | 5/2008 | Kritchman | B29C 41/48 700/118 |
| 9,561,622 | B2 * | 2/2017 | Das | G03F 7/70416 |
| 9,744,692 | B2 * | 8/2017 | Ikeda | B29C 31/042 |
| 9,770,869 | B2 * | 9/2017 | Comb | B29C 64/386 |
| 2006/0155418 | A1 * | 7/2006 | Bradbury | G05B 19/4099 700/182 |
| 2007/0173967 | A1 * | 7/2007 | Kritchman | B29C 41/48 700/118 |
| 2013/0228953 | A1 * | 9/2013 | Ikeda | B29C 31/042 264/401 |
| 2013/0313756 | A1 * | 11/2013 | Chen | B29C 41/52 264/401 |
| 2014/0309764 | A1 | 10/2014 | Socha-Leialoha et al. | |
| 2015/0266242 | A1 * | 9/2015 | Comb | B29C 67/0055 264/40.1 |
| 2015/0269282 | A1 * | 9/2015 | Nelaturi | G06F 17/50 700/98 |
| 2015/0269289 | A1 * | 9/2015 | Kim | G06F 17/5009 703/6 |
| 2015/0269290 | A1 * | 9/2015 | Nelaturi | G06F 17/5009 703/6 |
| 2016/0078670 | A1 * | 3/2016 | Wu | G06T 15/205 345/420 |
| 2016/0176117 | A1 * | 6/2016 | Lee | G05B 19/4099 700/98 |
| 2016/0221262 | A1 * | 8/2016 | Das | G03F 7/70416 |

OTHER PUBLICATIONS

Pandey et al.; "Slicing procedures in layered manufacturing: a review"; Image; one page.

Wang et al.; Saliency-Preserving Slicing Optimization for Effective 3D Printing; Computer Graphics; vol. 33; Nov. 2014; Image; one page.

Sabourin; Adaptive High-Precision Exterior, High-Speed Interior, Layered Manufacturing; Master of Science in Mechanical Engineering; Image; one page.

"First Office Action issued in Chinese Patent Application No. 201780004298.5", dated Aug. 30, 2019, 13 Pages.

Yuan, et al., "An Algorithm for Improving Efficiency of Fused Deposition Molding 3D Printing System", Published in College of Internet of Things Engineering, issue No. 6, Dec. 2014, 5 Pages.

* cited by examiner

PRINTING 3D OBJECTS WITH AUTOMATIC DIMENSIONAL ACCURACY COMPENSATION

TECHNICAL FIELD

This disclosure relates generally to three-dimensional (3D) printing or additive manufacturing, and more specifically to improving dimensional accuracy in creating 3D objects.

BACKGROUND

Creating 3D objects presents particular challenges both in terms of the complexity of modeling 3D objects and of generating 3D objects to accurately portray real-life objects. Many 3D printers or additive manufacturing devices print or generate objects from 3D models generated from computer aided design (CAD) applications, for example, by slicing the model into thin horizontal layers and depositing material (e.g., melted plastic, clay, concrete, metal powder, food stuff) vertically layer by layer. The layer height (thickness) is typically selected through a user interface (UI) control that allows either direct, fixed setting of layer height (e.g., 0.25 mm or 250 microns) or setting layer resolution in a simpler, general form with predetermined layer heights associated with standard printer terms (e.g., Fine, Normal, Draft, etc.). The layer height or layer resolution is closely linked to the tradeoff between print speed vs. vertical step resolution print quality. Contemporary slicing application software (slicers) generally fails to consider the impact that a fixed layer height has on the printed object's overall vertical dimension accuracy. Quantization in the form of fixed-height layer slices can result in vertical (z-axis) dimension errors of +− 50% of the selected layer height (e.g., 0.125 mm for a 0.25 mm layer height), two orders of magnitude over the typical x-y plane dimensional accuracy of 2 microns (0.002 mm) that can typically be produced by a well-adjusted 3D printer.

As a result of blind selection of layer height, 3D printed objects end up having vertical or z-axis features (including the top of the object) aligned to a multiple of the selected layer height and having a potentially large error in the printed object's z-dimension. For example, printing a 1.12 mm 3D object with a 250 micron layer will result in a 1 mm tall object in practice, or a 12% error. This error occurs because the object would require 4.48 layers, but the slicer rounds down to 4 layers. The error effects are not limited to the top of the object, but to all the object's features at different z layer heights. For example, consider the case of printing a stair object where the step increments do not align with the layer heights. This configuration results in errors at each step along the way to the object's upper surface. Generally controlled by stepper or servo motors, or other movement means, 3D printer hardware is capable of much higher precision on the Z axis—typically in the range of 10 microns to less than 1 micron (100 steps/mm-1600 steps/mm) resolution in practice. This fine positioning control in the z-axis hardware creates a theoretical opportunity to produce objects with z dimensional accuracy to within 1-10 microns (0.1 to 1% error). Accordingly, improvements to 3D printing processes can be made.

SUMMARY

Illustrative examples of the disclosure include, without limitation, methods, systems, and various devices. In one aspect, dimensional accuracy in generating a 3 dimensional (3D) object comprising a plurality of formable layers may be improved. At least one height configuration parameter and a total object height are received. A first height corresponding to at least a subset of the plurality of formable layers is selected based on the received at least one height configuration parameter and the total object height. The first height may be selected to optimize accuracy of at least one of the at least one height configuration parameter or the total object height. The first height may be communicated to a 3D printer to generate the 3D object.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Figure 1:
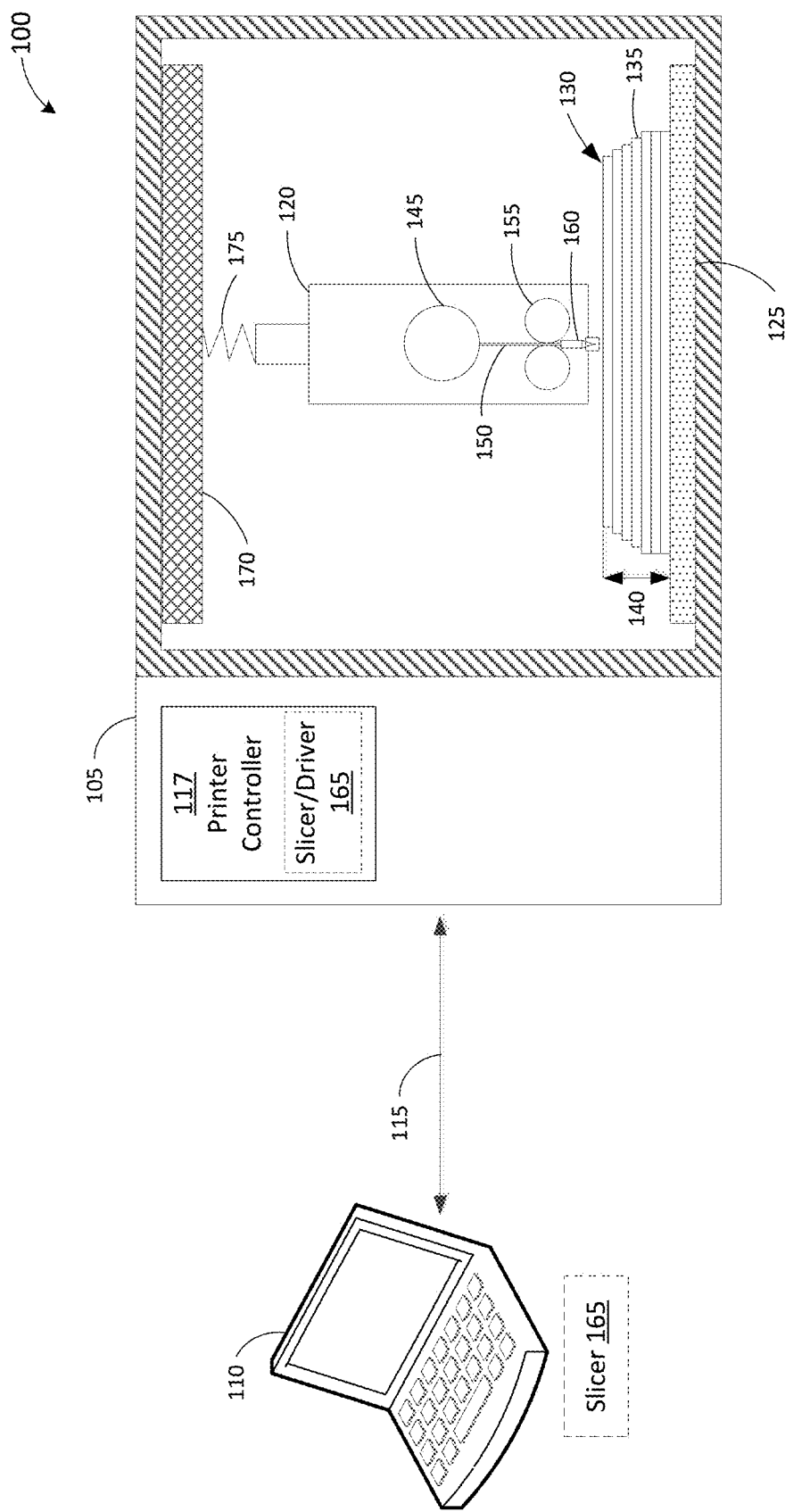
FIG. 1 depicts an example of a computing device in communication with a three dimensional (3D) printer capable of printing a 3D object.

For at least the purposes of this description, the selected terms and phrases herein may have the following meanings:

a) Bed-Leveling: refers to a 3D printer calibration process that measures the height of the print nozzle (hot-end) relative to the surface upon which the printed object will be made (a.k.a. print surface, print bed, build plate). The calibration process may include moving the print head across the print bed and stopping at multiple locations to measure the clearance between the nozzle and the surface. The calibration measurements may be used by the printer controller to adjust the z-axis height during printing, or may be used by the slicer to adjust the layer height for one or more layers where necessary to compensate for variation in the printer's nozzle-surface clearance at the points measured.

b) Feature: refers to any area or aspect of a 3D model where the dimensional tolerance of the printed object is important.

c) Local Feature: refers to 3D model features such as vertical slopes or angled surfaces, or those that have a high/low point (a.k.a. local maximum/minimum) above/below nearby surrounding surfaces, but always lower than the 3D model's total height.

d) Layer: a single delta z-axis, fixed-height planar horizontal slice of a 3D model by which to guide a 3D printing machine to deposit material onto a platform or onto a previously deposited layer of material.

e) Slice: refers to a single, typically vertical, cross-sectional layer of a 3D object model.

f) Slicer: a software program that converts a 3D object model into a collection of sliced layers of one or more layer heights. The sliced layers may be viewed graphically on a display, or converted to toolpath commands used to instruct a 3D printer to create a physical manifestation of the 3D object model. Slicer program functionality may be performed wholly or in part on a mobile or other personal computing device, on a computing component within a 3D printer, or on a local or remote computing environment that may include physical or virtualized computing resources (e.g., datacenter server, virtual machine).

g) Global Layer Height: refers to a layer height defined by the print quality selection (e.g., draft, normal, fine), and adjusted as required to produce an accurate, and in some cases the most accurate total height dimension in a 3D printed object as specified by the corresponding model data.

h) Optimal Layer Height: refers to a layer height that results in printed 3D object height features having dimensions exactly as modeled, or as close as achievable when combining constraints of multiple parameters such as, e.g., tolerances of multiple object model height features, minimum resolution capability of 3D printer, or proximity of local layer height features to other layer height features.

i) Height Configuration Parameter: specifies an aspect of height (z-axis dimension) of a 3D model or object. For example, this may be, but is not limited to, nominal layer height, total height, local feature height, height tolerances, z-axis height tolerance of vertical sloping or curved surfaces, etc.

j) Total Height: refers to the distance from the lowest surface to the highest surface or point of a 3D model (i.e., the total z-axis dimension).

Systems and techniques are described herein for selecting a layer height for generating a 3D object to improve dimensional accuracy of the generated 3D object. In one aspect, the layer height may be determined based on the total height (z-axis dimension) of a 3D object model to be generated using a 3D printer or other additive manufacturing technique, and at least one height configuration parameter that may be obtained or received. A layer height selected for at least a subset of a plurality of formable material layers that will be printed to form the 3D object, may be determined based on the total object height and at least one height configuration parameter. The layer height may be selected to maximize accuracy of at least one of the 3D object's total height or one or more local/global maximum height features of the 3D object model, or other configuration parameters. In some aspects, for example, based on design considerations or user selection/preference, an optimal layer height may be selected by computing an error associated with using the nominal or current layer height to print the remaining layers required to reach the next local/global maximum height feature of the 3D object model or to reach the total object height. In some aspects, the error associated with using the nominal or current layer height to print the remaining layers to reach the next local maximum height feature of the 3D object model may be weighted more heavily in selecting an optimal layer height relative to the error associated with total object height, vice versa, or in any proportion (e.g., according to user preference, etc.). In some aspects, a positive error computed to print the remaining layers to reach the next local/global maximum height feature of the 3D object model or to reach the total object height may result in selecting a slightly smaller slice layer height than that selected by the user due to slightly higher print resolution, whereas selecting a slightly higher layer height for a negative error may not be chosen due to a slightly lower print resolution.

In some cases, the height configuration parameter that may be obtained or received may include a print resolution (e.g., slice layer height), such as a selection of fine, normal, or draft print modes (similar to an inkjet or other such printer), a user-selected layer height value (e.g., 250 microns), a selection of the 3D object's total height having a corresponding tolerance or required accuracy, one or more tolerance or accuracy requirements, one or more selections of subsets of 3D object local/global maximum/minimum height features having a corresponding tolerance or required accuracy, one or more tolerance or accuracy requirements, a maximum print time or minimum print speed, one or more layer height variation limitations (e.g., to preserve uniform ridges on vertical or side walls of the 3D object by not varying the layer height too much), et al.

In some cases, a single layer height value may be selected as a global layer height. In this scenario, the global layer height may be selected so that the total object height is as close as possible to an even multiple of the layer height. In some aspects, a total number of layers may also be selected in conjunction with the global layer height to equal or best approximate the total object height. The global layer height may also be selected to maximize the accuracy of the at least one height configuration parameter, such as a print resolution, a user-selected layer height value, or to meet a tolerance value, or to minimize error of one or more local maximum/minimum height features. It should be appreciated that a number of different techniques may be used to determine a global or other layer height value, including the weighting scheme described above, machine learning techniques, and so on.

In some aspects, the described techniques may also include local optimization of the layer height corresponding to a subset of the plurality of layers that form local maximum/minimum height features of the 3D object (e.g., dynamic adjustment of layer height). In some cases, the selection of a layer height corresponding to a subset of layers may be performed in a similar manner as described above for the global layer height. In some cases, the total height or z-dimension of the subset of layers may be treated as a total object height. In some aspects, localized errors may be weighted less heavily than global errors, such that the total object height/total height of the subset of layers is a more important factor than localized z-dimensional accuracy for selecting one or more layer heights. In other cases, acceptable error bounds may be configured or individually selected.

In some aspects, a 3D printing software application, generally referred to as a slicer or 3D print driver, which may execute on a computing device, may perform the above-described techniques for selecting one or more layer heights for a 3D object to be printed or generated. Any of a number of input means, for example, of the computing device, may be used to obtain the total object height and the height configuration parameter(s). In some cases, the slicer or other device or application may determine the total object height and/or one or more height configuration parameters (e.g., identifying z-axis features) from a model of the 3D object to be printed, for example from a computer aided design (CAD) package, image data from a 3D scanner, etc., such that dimensional accuracy optimization may be performed automatically.

In some cases, a layer height associated with the first layer height may be individually selected, such as to be larger than a global or other layer heights associated with a 3D object, to ensure bottom layer adhesion to the print bed during printing. It should be appreciated that any of a number of individual 3D object height feature layers or subsets of 3D object height feature layers may be separately configured, via similar processes as will be described in greater detail below.

It should be appreciated that the described techniques may be applied to various 3D object generation techniques implementing a fixed layer approach, such as extrusion techniques including fused deposition modeling (FDM), fused filament fabrication (FFF), Robocasting or Direct Ink Writing (DIW), or other types of additive manufacturing techniques that use a slicing or layered method, such as Vat Photopolymerisation, Material Jetting, Binder Jetting, Powder Bed Fusion, Directed Energy Deposition, etc.

FIG. 1 illustrates an example system 100 including a computing device 110 in communication with a three dimensional (3D) printer 105 capable of or configured to print a 3D object 130. The computing device 110 may include any of a laptop, a desktop or personal computer (PC), mobile devices such as smart phones, tablets, etc., networked devices, cloud computing resources, or combinations thereof. The computing device 110 may communicate with 3D printer 105 via a wired connection or any of a variety of wireless connections 115, as are known to one of skill in the art. The 3D printer 105 may have or be associated with any of a variety of transceivers, modems, NICs, etc., typically associated with the printer controller 117, to communicate with computing device 110 via wired and/or wireless connection 115. In general, the computing device 110 may execute or access (via a network or via the cloud), one or more software programs or applications that take 3D object data and translate the data into instructions executable by the printer controller 117 controlling the 3D printer 105 (e.g., G-code) to enable 3D printer 105 to form 3D object 130 by extruding material onto the base 125 in multiple (e.g., separately) configurable layers 135. For reference purposes, and as used throughout, the software application, which may in some cases include a CAD component, a CAM component, 3D image capture and translation functions, and so on, may be referred to as slicer or driver 165. In most circumstances, the slicer 165 will be associated with the computing device 110. However, it is contemplated herein that the slicer 165 may be in whole or in part associated with an individual 3D printer 105 that might, but not necessarily be a function of or within the printer controller 117, without departing from the techniques described herein.

The 3D printer 105 may include one or more extruder assemblies 120 positioned over an object base or bed 125. The extruder assembly 120 may be moved in at least the vertical direction (z axis) by movement means 175, which may include one or more stepper or servo motors, as is generally known in the art. The movement means 175 may also move the extruder assembly 120 in the horizontal plane (x or y axis), such as along the upper plate 170 relative to the base 125. Other 3D printer 105 designs fix the extruder 120 in the z-axis and move it in the x-axis and y-axis while moving the bed 125 in the z-axis. Yet other designs move the extruder 120 in the z-axis and x-axis while moving the bed 125 in the y-axis. Still other designs operate using a polar coordinate system to move the extruder 120 over a stationary bed 125. The techniques described herein are applicable to these and other variations of 3D printer configurations (such as Delta Parallel Kinematic printers). In some aspects, the extruder assembly 120 may include or house one or more filaments 150, for example wound/stored in spool 145. In other cases, the filament 150 may be stored or housed in other portions of the 3D printer 105 or completely external to the 3D printer 105. The extruder assembly 120 may also include opposing rollers 155 that drive filament 150 into a heated nozzle 160, at a specified rate, whereby the filament is melted and extruded onto the most recently deposited layer of layers 135 previously deposited onto base 125. The extruder assembly 120 may include means, such as one or more motors, other drive mechanisms, etc., for controlling the rate at which filament 150 is fed into the heated nozzle 160 by rollers 155 and extruded from nozzle 160, thus controlling the height of each layer of layers 135.

According to the techniques described herein, the extruder assembly 120 may be controlled to extrude filament at a specified rate to deposit one or more layers 135 of a material at a certain layer thickness or having a certain z-dimension. In one aspect, the height of one or more of layers 135 may be determined, for example, based on the total height 140 of the 3D object 130 to be printed. In some aspects, the height of one or more of layers 135 may be determined based on at least one layer height configuration parameter, such as a print resolution, a selected or default layer height, hardware limitations of the 3D printer (e.g., highest possible z-axis resolution, or steps thereof), or any of a variety of tolerance values or error requirements (e.g., maximum error value), corresponding to one or more layers 135, etc. In some cases, the tolerance value(s) may be selected for certain local object maximum height features of a 3D object or for all 3D object height features, and the layer height may be automatically selected based on errors calculated on localized feature maximum/minimum heights, global layer height, or the total 3D object height. In some aspects, the slicer 165 may determine or select the one or more layer heights for printing the 3D object 130. In yet some cases, the computing device 110 and/or slicer 165 may provide a user interface for enabling a user to manually configure or set one or more parameters for generating the 3D object 130.

Figure 2:
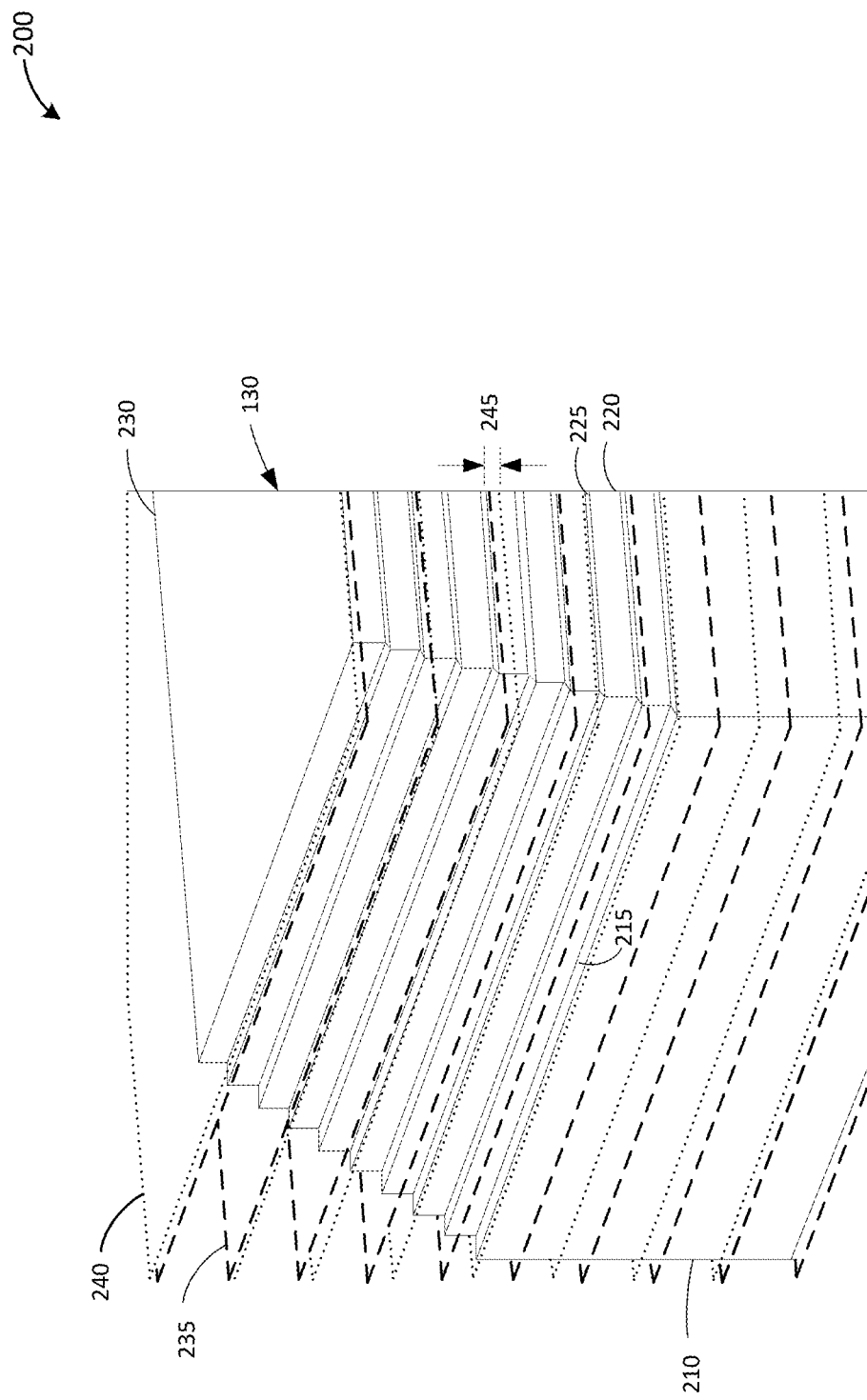
FIG. 2 depicts an example perspective view of a 3D object segmented into 2 sets of layers, each having a different thickness or layer height.

FIG. 2 illustrates an example diagram 200 of a 3D object, such as 3D object 130 of FIG. 1, segmented into 2 sets of layers, each having a different thickness or layer height. The 3D object 130 may include a first or bottom portion 210, including multiple layers, and having an upward-facing surface 215. 3D object 130 may also include a number of stepped portions 220 each having approximately a uniform thickness and an upward facing surface 225, stacked on top of the bottom portion 210. The 3D object 130 may further be defined by a top surface 230.

3D object 130 may be printed, for example, by 3D printer 105, according to a number of different configurations, including different global layer heights, as represented by dashed lines 235, and dotted lines 240. Layer height 235 is selected according to the techniques described herein for z-axis dimensional accuracy optimization, whereas the layer height 240 may represent a generic or default layer height. Layer height 235 is less than layer height 240, and aligns to a greater extent with upward facing surfaces 215, 225, thus resulting in less z-axis error (as illustrated by distance marker 245).

In some cases layer height 240 may be selected to best approximate the z-axis features of 3D object 130. In the example illustrated, the layer height 240 still results in some errors in the z-axis (every other stepped portion 220 is omitted). This may be due to a print resolution limitation, such as a draft or normal mode that specifies a minimum layer height (e.g., greater than each of stepped portions 220). In other cases, other layer heights may be selected to generate a best fit 3D object that aligns more precisely to data defining the 3D object. In some cases, higher resolution may result in a longer print time, whereas lower resolution may result in a faster print time. In some aspects, a maximum print time may be selected, for example, by a user, to limit or otherwise bound the maximum print resolution used.

Figure 3:
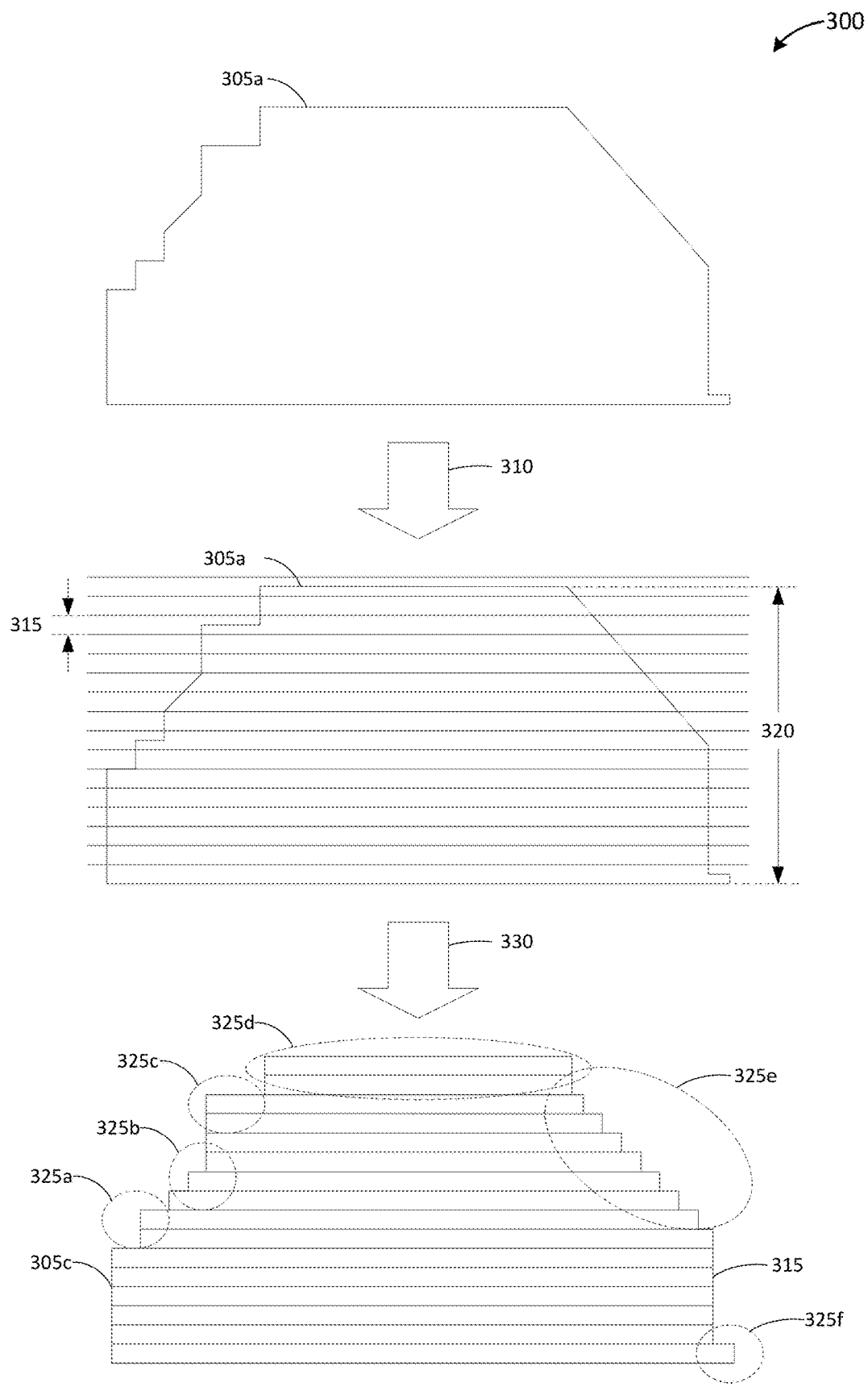
FIG. 3 depicts an example process for segmenting an object into layers by a slicer associated with a 3D printer.

FIG. 3 depicts an example process 300 for segmenting a 3D object 305 into layers for 3D printing or 3D generation. A layer height may be selected (e.g., a default layer height) for printing 3D object 305 at operation 310, without adjusting for z-dimension features of the 3D object 305. Operation 310 may result in slicing the object 305 into a number of layers having a thickness 315. The sliced object 305a may then be printed at operation 330. Thickness 315 may not be a multiple of the total object height 320, and so may result in error in the total object height at 325d. The layer height 315 may also not align with other stepped portions of the 3D object 305 (e.g., sections 325a, 325c, and 325f) and/or may result in sizeable errors in sloped portions of the 3D object 305 (e.g., 325b and 325e).

Figure 4:
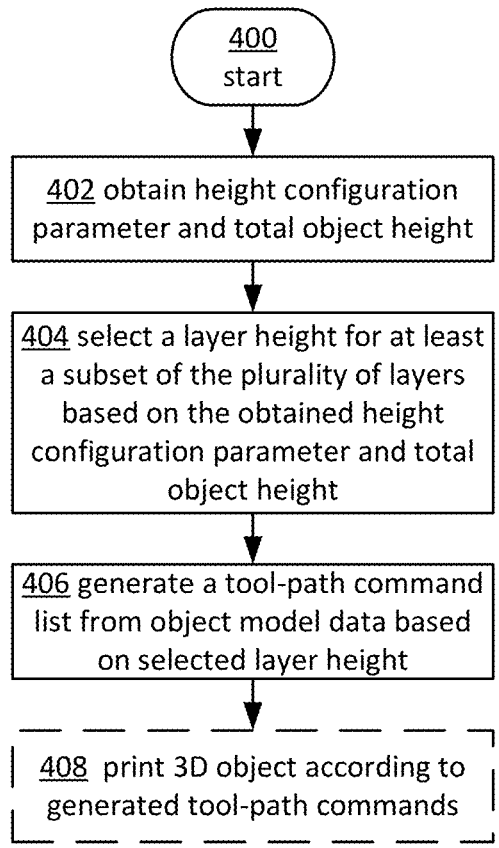
FIG. 4 depicts operational procedure for selecting a layer height for at least a subset of the plurality of layers forming a 3D object.

FIG. 4 illustrates an example operational procedure 400 for selecting a layer height for at least a subset of the plurality of layers to form a 3D object and improve z-dimension accuracy. Procedure 400 may, in some instances, be performed by slicer 165, computing device 110, 3D printer 105, or a combination thereof. Procedure 400 may begin at operation 402, where at least one height configuration parameter or a total object height may be obtained. In some cases, operation 402 may include receiving the at least one height configuration parameter or a total object height as selection or input events via a user interface operating in conjunction with slicer 165, for example, provided via computing device 110. In some cases, one or more of the height configuration parameter(s) or total object height may be obtained or determined from 3D object data, for example associated with a 3D model of the object to be printed. In some aspects, the 3D object data may be accessed from a CAD or other modeling application or program, or may be obtained from a 3D scanner or associated application, or from other locations or applications.

In some aspects, 3D object models may have localized height features that may be required to be printed with a specified accuracy or dimensional tolerance. For example, when selecting a portion of 3D object model data (e.g., via CAD software or a user interface associated with the slicer 165, etc.), a higher or specified tolerance (i.e., error margin) may be assigned that must be met in order for the 3D object data to be sent to the 3D printer and actually printed. Selecting a portion of the 3D object data may include identifying one or more z-axis features of the 3D object data, for example, graphically. In other cases, an accuracy requirement or tolerance may be automatically assigned to certain height values/layers of a 3D object model and specified in a height configuration parameter. In some aspects, a user interface may provide a visual representation of the 3D object including specific heights at which layers will be formed, for example, in a preview or print preview format or screen. This may enable a designer to more readily and more efficiently optimize layer height(s) for printing a 3D object, when, for example, not all error requirements for specific layers can be met in one print, or in other circumstances, such as, to fully customize a print and identify specific locations associated with different accuracy requirements.

When the user has selected a 3D model and is prepared to print the modeled object on a 3D printer, a user interface (UI) may be presented to the user for selection of various options that affect the quality of the printed object, the speed with which it will print, and other user-selectable relevant parameters. The UI may be incorporated into the slicer 165, into the print application that executes when the print command is issued (e.g., clicking the print button) from an application that executes on a computing device 110, or in another manner (e.g., cloud service) prior to executing the actual layer height calculations and model slicing function. In one embodiment, a feature may be provided that allows the user to activate the 3D print function from a 3D computer aided design/modeling (CAD) application. The feature may include rendering a menu of 3D printers or vendor services for a user to select. Upon selection by the user, the feature may render a UI that presents resolution and other configuration parameter settings (e.g., draft mode, normal mode, fine mode, raft/no raft, support) to a user for selection. Since the UI is activated directly from the CAD application, the UI may have direct and easy access to data related to the 3D model for generating parameter options for the user to select.

The UI may process data from the 3D model associated with the print request action, to present configuration options for a user to select, or to provide default parameter values based on simple calculations and other parameters related to features of the 3D model that may be used by the slicer 165 for determining optimal layer heights for slicing the model in preparation for printing the corresponding object. The UI application may receive data describing the 3D model from which it may extract, determine, and identify (e.g., graphically for a user) not only the total 3D modeled object height, but other features of interest which may be subject to loss of dimensional accuracy if a fixed layer height were selected for slicing the entire model. For example, the UI may present a graphical representation of the model with features of interest identified via markers, colors, circles, highlights, or other means of identifying features to a user. Selecting a feature (e.g., via mouse click, finger or stylus touch) may cause the rendering of an option box showing the modeled dimensional values for the feature and the dimensional error produced if sliced using the layer height associated with the resolution setting chosen (e.g., draft, normal, fine, user defined), and enabling a user to specify a maximum dimensional error for the selected feature. Additionally or alternatively, the UI may present a graphic object with which the user can scale the model to adjust the dimensions as desired for the printed object, and present information on features of interest in a list or other collection of UI elements showing the modeled dimensions and errors produced at the current fixed resolution setting. The UI may present the calculated time to print the object given the current configuration parameter option settings and for changed settings. In this manner, the user may assess the tradeoff between the choice of resolution settings, the choice of error tolerances, etc, and the time required to print the object. The UI may enable a user to control the dimensional accuracy of selected 3D model features as required to meet the precision needs for the object being printed in the least amount of time. In some cases, the height configuration parameter may include a print resolution, such as a selection of fine, normal, or draft print modes (similar to an inkjet or other such printer), a selection from a different print resolution scheme, one or more selected layer height values (e.g., 250 microns for certain layers, and 150 microns for other layers), one or more selections of subsets of layers having a corresponding tolerance or required accuracy, one or more tolerance or accuracy requirements, a maximum print time or minimum print speed, one or more layer height variation limitations (e.g., to preserve uniform ridges on vertical or side walls of the 3D object by not varying the layer height too much), etc.

In one example, a "Click to Fit" feature may be included in a 3D modeling UI, in a printing preview screen or 3D print dialog window, etc., that enables selection of one or more specific features on the z-axis to maximize for accuracy. The "Click to Fit" feature may be implemented through selection of locations on a 3D model of the 3D object to be printed or rendered via a cursor, drawing an area (e.g., box) around one or more z-axis features, or other graphical selection actions. This feature may optimize error or tolerance calculations to provide solutions of otherwise unsolvable constraints on a 3D object (e.g., by prioritizing which tolerances are most important/which are less important). In one aspect, upon receiving a selection of the plane, an indication may be sent to the slicer to optimize fit of that particular z-axis value or height.

Procedure 400 may continue at operation 404, where a layer height for a least a subset of the plurality of layers may be selected based on the total object height and the one or more height configuration parameters. In some aspects, a global layer height may be determined, such that it is optimized to best fit some or all of z-axis (i.e., height) features of the 3D object, according to the one or more height configuration parameters. More details of operation 404 will be described below in reference to FIGS. 5, 6, and 8.

Next, in some aspects, at operation 406, the slicer may generate a tool-path command list based on the selected or determined layer height and the object model data. The tool-path command list is typically generated in the form of G-code that instructs the 3D printer in the aspects of motion, material temperature and extrusion rate, print bed temperature, and any other instructions required for a 3D printer 105 to print or generate the entire 3D object according to the determined layer height and object model data. The tool-path command list is typically stored in a file (e.g., on a computing device or removable storage media e.g., SD card) or transmitted directly to the printer to print the 3D object according to the generated tool-path commands 408. Generating the tool-path file is not limited to using G-code, but may use any variety of formats or code optimized for a 3D printer.

Figure 5:
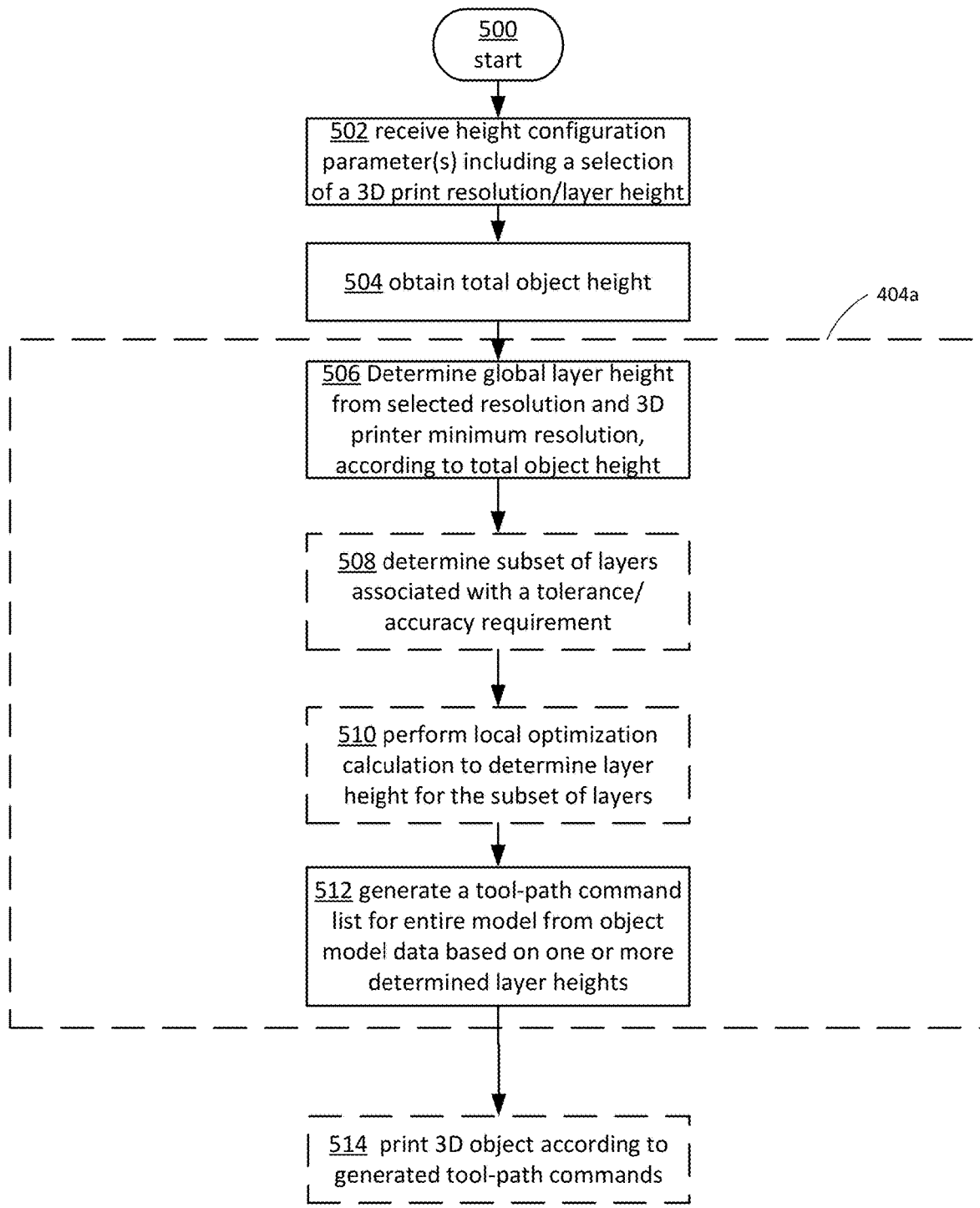
FIG. 5 depicts an example of a more detailed operational procedure for selecting a global layer height and a localized layer height for at least a subset of layers of a 3D object.

FIG. 5 illustrates an example of a more detailed operational procedure 500 for selecting a global layer height and a localized layer height for at least a subset of layers of a 3D object. As with procedure 400, procedure 500 may be performed by slicer 165, computing device 110, 3D printer 105, or a combination thereof. Procedure 500 may share some operations with procedure 400; for the sake of brevity, the duplicative operations will not be described again here.

Procedure 500 may begin at operation 502, where a height configuration parameter including a selection of a 3D print resolution and/or a specified layer height may be received, for example, via a user interface associated with or provided by the slicer 165. Information that indicates the minimum z-axis or height increment of which the 3D printer 105 is capable (i.e., minimum printer resolution capability, such as 0.625 microns) may be obtained for example, by querying the 3D printer 105 for hardware specifications, via the slicer 165, a driver associated with 3D printer 105, or a variety of other ways including receiving 502 configuration parameters or specifications of the 3D printer 105, such as in an XML or other type of file. Such a configuration file associated with a specific 3D printer may contain the nominal print resolution (i.e., nominal layer height) settings for draft, normal, and fine modes specified along with other capabilities (e.g., auto-calibration) or operational parameter settings determined, based on the specific 3D printer capabilities, to produce the best print quality and speed associated with the modes selected by default or by the user. Next, at operation 504, the total object height of the 3D object to be printed may be obtained. The total object height may be derived or obtained from 3D object data, or may be received via the user interface.

Next, at operation 404a, which may include a more detail for operation 404 of FIG. 4, a global layer height may be determined. Operation 404a may first include at operation 506, determining the optimal global layer height based on one or more configuration parameters received at operation 502, such as the minimum z-axis increment of which the 3D printer 105 is capable, the selected 3D print resolution, and the total object height obtained in 504. Ideally, 3D object model total height will be evenly divisible by the determined optimal global layer height. If the determined optimal global layer height is not evenly divisible by the minimum height resolution of the 3D printer 105, then the nearest global layer height value above or below the optimal global layer height, that is evenly divisible by the minimum height resolution of the 3D printer 105, may be a candidate for the global layer height.

Determining whether to use the global layer height above or below the optimal global layer height may be based on the 3D object model's total height accuracy/tolerance requirement, or simply on the basis of that which will result in the printed object having a total height closest (above or below) to that of the 3D model.

In some cases, if received height configuration parameters 502 indicate the existence of one or more local height features in the 3D model having tolerance or accuracy requirements, operation 508 may be performed to determine a subset of layers whose layer height may be altered to achieve the tolerance or accuracy requirement. Ideally, the determined layer height change in the subset of layers (e.g., less than +/−10% of global layer height) would not be noticeable in the appearance of the outer surface of the resulting object printed from the 3D model. For example, if a local feature whose accuracy requires a high point to terminate at a point in the middle (i.e. at 50%) of a global layer height slice, the height of a subset of layers may be adjusted linearly or non-linearly at operation 510 so that the local height feature is reached as close as possible to the top of one of the subset of layers. A linear, square-wave shaped layer height adjustment might be accomplished by selecting a subset of ten layers, five above and five below the feature, with the first five layers having a height 10% less than the global layer height and the second five layers having a height of 10% above the global layer height. One non-linear layer height adjustment that may achieve the same dimensional result as a linear adjustment but possibly with a less noticeable visual impact, may be a sinusoidal waveform approximation. In this case, each layer height of a subset of layers may be reduced at an increasing rate until an inflection point is reached, and reduced at a decreasing rate until a minimum layer height occurs with its surface layer at the height that matches the local feature. A subset of ten layers with a rough sinusoidal approximation applied to layer height changes to reach the local feature height in the immediate example could comprise successive changes to the Global Layer Height value in a sequence such as: {−6%, −11%, −16%, −11%, −6%, +6%, +11%, +16%, +11%, +6%}.

Table 1 shows a comparison of cumulative object height 1) without a subset of adjusted layers, 2) with a 10-layer subset adjusted using a linear layer height adjustment scheme, and 3) with a 10-layer subset adjusted using a non-linear (e.g., rough sinusoidal approximation) layer height adjustment scheme to meet the local feature height dimension at sub-layer 5 of 50% of the Global Layer Height for that layer. The layer height values shown are in millimeters and the cumulative heights are relative to the surface below the ten layers listed. Layer 5 in both the linear and non-linear subset layer adjustment columns, is exactly 50% below that of where the printed objects surface would be without a subset layer adjustment, and exactly the height dimension of the local height feature target. Following layer 5, both subset layer height adjustment profiles compensate for the reduction in overall global height resulting from the first five height-adjusted subset layers by adjusting the height of the next five subset layers where by layer 10, the compensation has fully corrected for the subset layer height reduction and is at the same cumulative layer height that it would have been without the presence of a local height feature, and returns to using at the global layer height starting with the next layer.

Next, in some aspects, at operation 512, the slicer may generate a tool-path command list based on the selected or determined global layer height, local subset layer heights (if any), and the 3D object model data. The tool-path command list is typically generated in the form of G-code that instructs the 3D printer in the aspects of motion, material temperature and extrusion rate, print bed temperature, and any other instructions required for a 3D printer 105 to print or generate the entire 3D object according to the determined layer height(s) and object model data. The tool-path command list is typically stored in a file (e.g., on a computing device or removable storage media e.g., SD card) or may be transmitted directly to the printer to print the 3D object according to the generated tool-path commands 514. Generating the tool-path file is not limited to using G-code, but may use any variety of formats or code optimized for a 3D printer.

In other aspects, at operation 512, the optimal layer heights may be determined in a software module or program that may be part of, or associated with, a 3D modeling CAD application on a computing device 110, a 3D printer driver in a computing device, in a 3D printer 105, in a local or remote computing environment, or a combination thereof. Instead of, or in addition to, generating tool-path command lists, the software module or program may generate a list of the optimal layer heights at which to slice an object and at operation 514, send the list to a file stored on a storage device or directly to a 3D printer 105 where a resident slicer 165 module associated with a 3D model printer will slice the model based on the list.

Figure 6:
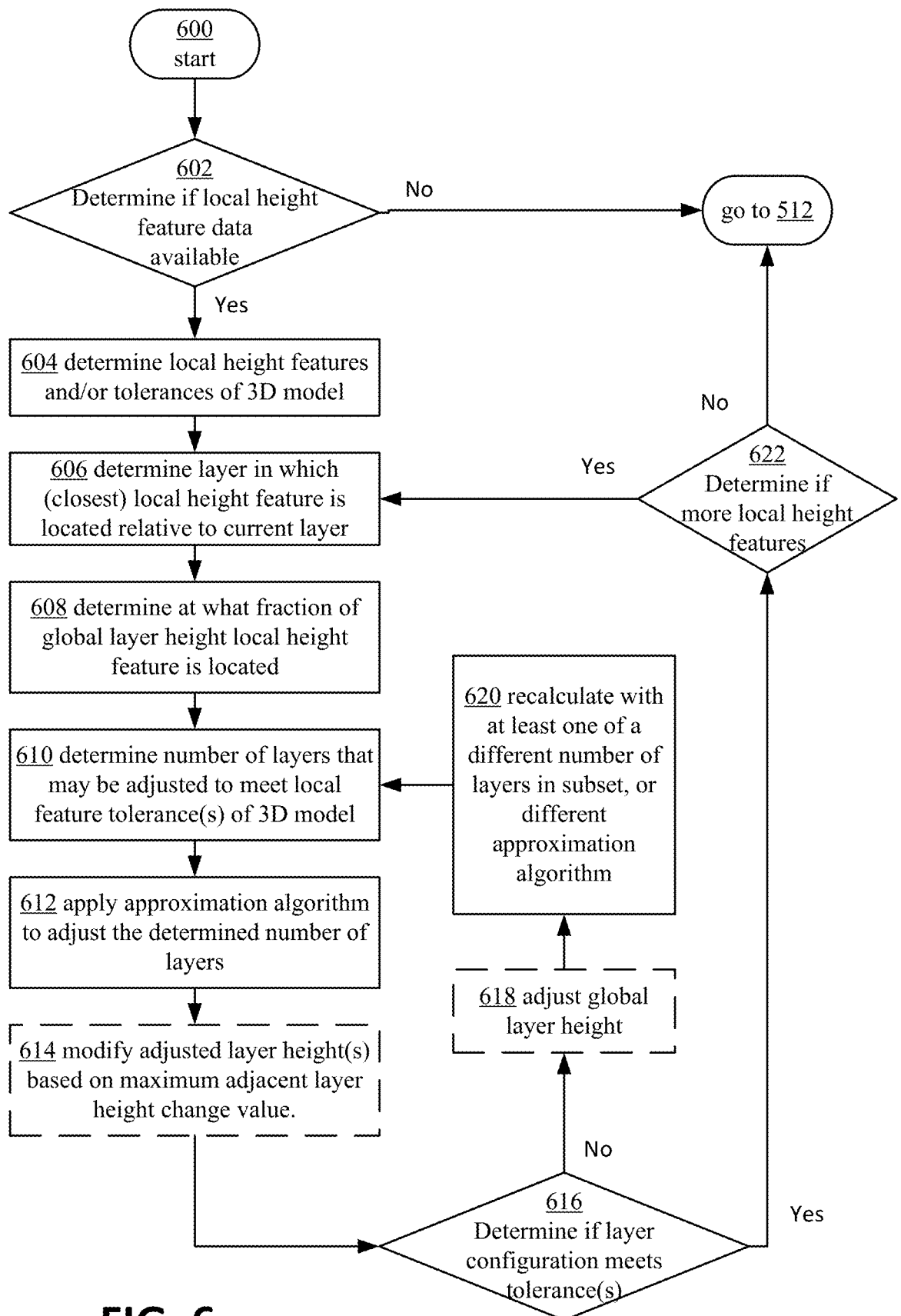
FIG. 6 depicts another example of a detailed operational procedure for selecting a layer height for at least a subset of layers of a 3D object.

FIG. 6 illustrates another example of a detailed operational procedure 600 for selecting a layer height for at least a subset of layers of a 3D object. In some aspects, procedure 600 may correspond to operation 508-510 described above in reference to FIG. 5. Procedure 600 may, in some instances, be performed by slicer 165, computing device 110, 3D printer 105, or a combination thereof.

TABLE 1

Subset Layer Height Adjustment Profile Comparison

| Layer Number | Global Layer Height | Cumulative Without Subset Surface Below | Linear Subset Layer Heights (% Global Layer Height) | Linear Cumulative Height Surface Below | Sinusoidal Subset Layer Heights (% Global Layer Height) Subset of Layers | Sinusoidal Cumulative height |
|---|---|---|---|---|---|---|
| 1 | 0.250 | 0.250 | −10% | 0.225 | −6% | 0.235 |
| 2 | 0.250 | 0.500 | −10% | 0.450 | −11% | 0.458 |
| 3 | 0.250 | 0.750 | −10% | 0.675 | −16% | 0.668 |
| 4 | 0.250 | 1.000 | −10% | 0.900 | −11% | 0.890 |
| 5 | 0.250 | 1.250 | −10% | 1.125 | −6% | 1.125 |
| 6 | 0.250 | 1.500 | +10% | 1.400 | +6% | 1.390 |
| 7 | 0.250 | 1.750 | +10% | 1.675 | +11% | 1.668 |
| 8 | 0.250 | 2.000 | +10% | 1.950 | +16% | 1.958 |
| 9 | 0.250 | 2.250 | +10% | 2.225 | +11% | 2.235 |
| 10 | 0.250 | 2.500 | +10% | 2.500 | +6% | 2.500 |

It should be appreciated that here are many approaches for determining a subset of layers and adjusting the layer height for the subset of layers, all of which will not be explicitly described herein. However, most if not all of the computations used to determine the number of subset layers and their height may consider other local features with height tolerance/accuracy that may lie within the layer subset selected, and, in some cases, may compensate for the impact on the total object height that the collective subset layers with different heights have.

Procedure 600 may begin at operation 602, after a global layer height has been determined at operation 506 described above in reference to FIG. 5. Operation 602 may include determining if local height feature data is available for the 3D model. If no local height feature data is included in the received height configuration parameter data, then procedure 600 may end and continue to operation 512. However, if local height feature data is available for the 3D model, then procedure 600 may continue to operation 604, where the received height configuration parameter data may be analyzed to determine local height features of the 3D model, along with any associated data specifying dimensional tolerance or error limits. Next, at operation 606, the layer in which the closest local height feature is present in the 3D model may be determined, for example, relative to a current layer being modeled. In some aspects, operation 606 may include determining, from lowest to highest, which global layer above the current layer being evaluated has the nearest local height feature.

Procedure 600 may then proceed to operation 608, where the fraction of the global layer at which the local height feature peaks (e.g., the top of the height feature), is located. For example, the number of layers from the base of the 3D object model to the local height feature may be determined by dividing the height of the local feature by the determined global layer height, with any non-zero remainder indicating at what fraction of the global layer height the local height feature peaks. Next, at operation 610, the number of a subset of layers whose height may be adjusted to meet the dimensional accuracy (tolerance) requirement, if specified for the height feature, may be determined. This determination may be achieved based on at least one of the determined global layer height, the fraction of a global layer height in which the local height feature peaks, and the minimum z-axis height resolution supported by the target 3D printer 105, a user selection, etc.

Next, at operation 612, any of a number of approximation algorithms may be applied to adjust the determined number of layers from operation 610. For example, if the fraction of a local height feature peaks at half of the determined global layer height of 0.25 millimeters, as indicated in Table 1, then using a linear square-wave approximation, reducing the subset layer height by 10% (i.e., 0.225 mm) for five layers will exactly equal the dimensional height of the local feature at the top of the $5^{th}$ layer. The 0.225 mm subset layer height works well for 3D printers with a minimum height resolution of 1 micron (0.001 mm), but it may not be equally divisible by the minimum height resolution of the other 3D printers (e.g., 0.010 mm). In such cases, the number of subset layers, the subset layer heights, other types of adjustment profiles (non-linear), and the associated feature height tolerance may be considered/adjusted algorithmically to determine the best layer height that will produce the local feature peak within its associated tolerance.

An additional consideration for determining subset layer height adjustment is the visual effect associated with increasing differences in adjacent layer heights. In some aspects, at operation 614, the adjusted layer heights of the subset of layers may be modified based on a maximum adjacent layer height change value. For example, a 10% change in layer height in adjacent layers may impact the visual quality for some models and be of no concern for others. Referring to the example depicted in Table 1, layer 6 is 20% higher than layer 5 for the linear adjustment scheme and 12% higher than layer 5 for the sinusoidal wave approximation scheme. Both of these adjustment schemes could accommodate a 10% adjacent layer height change limit requirement by simply slicing layer 6 at the global layer height and shifting the layer heights shown for layers 6-10 to layers 7-11. Accordingly, the maximum change in adjacent layer height may be user-adjustable through a configuration setting. Some curve-fitting algorithms may be well suited to solving the problems of determining subset layer heights and numbers given the variety of potential determined global layer heights, local feature heights, printer resolutions, and finishing visual effect settings.

Next, at operation 616, it may be determined whether the resulting layer height adjustments to the subset of layers meet the specified tolerance(s). If yes, procedure 600 may proceed to operation 622, where it may be determined whether there are any more local height features. If the 3D model data includes more local height features, procedure 600 may proceed back to operation 606 and continue to cycle through to operation 622, until no more local height features are present in the 3D model data, at which point, procedure 600 may proceed to operation 512. If the tolerance(s) have not been met, procedure 600 may proceed to operation 620, where at least one of a different number of layers in the subset of layers, or a different approximation algorithm may be implemented, and operations 610-616 repeated until a satisfactory layer height adjustment or configuration has been determined. In some aspects, if one or more local feature heights cannot be produced with local height adjustments, the global layer height of the 3D model may be adjusted at operation 618.

In some aspects, if a global layer height that would produce a printed object meeting the specified tolerance for the total object height could not be determined as described at operation 506, then layer height adjustments in layer subsets may be applied to the global layer height to produce a printed object that would be closest to meeting the specified tolerance for the total object height. One approach to making global layer height adjustments to bring the total object height within specified tolerance limits is to divide the total object height error that would result from using the determined global layer height, by the minimum printer height resolution. For example, if an object with a total object height tolerance of +0/−50 microns would be produced by using the determined global layer height with a resulting error of +28 microns, and the 3D printer minimum height resolution is 10 microns, the total object height can be printed with an error of −2 microns (well within its specified tolerance) by reducing the height of one layer by 30 microns, or by reducing the layer height of 3 layers by 10 microns. These layer height adjustments may be preferentially made at layers near the top of the object to avoid complicating local height feature subset layer height adjustment calculations, but may be made individually or together as layer subsets and located anywhere in the model slice stack.

It should be appreciated that procedure 600 is only given by way of example. It is contemplated herein that different error values associated with multiple subsets of layers (including single layers) may be used in selecting one or more different layer heights as needed, for example, to accommodate all of the constraints of a 3D object in light of user preferences/height configuration parameters. In one example, if procedure 600 is unsuccessful in selecting a single layer height for a subset of layers, for example, due to higher constraints placed on error ranges, the subset of layers may be split into two different subsets, and layer heights for each subset may subsequently be tested, each according to a separate performance of procedure 600. If independent solutions can be obtained, then the combination of the two subsets, each with a different layer height, may instead be used to meet the error requirements. If two subsets do not satisfy the error requirements, a master subset may be divided into 3 or 4 subsets, and so on. In some cases, the amount of subset divisions that are allowed to occur may be constrained by another height configuration parameter, such as a layer height variation limitation, for example implemented to yield a more uniform, in the z-dimension, printed 3D object (e.g., to reduce different layering effects visible on the exterior and vertical or partially vertical faces of the 3D object).

An example of procedures 500 and 600 will be described below. In one example, an object having a total object height of 1.1 mm may be selected for 3D printing (e.g., operation 504), with a user-specified normal mode layer height of 250 microns (0.25 mm) (e.g., received from operation 502). At operation 506, the 3D printer driver application in computing device 110 may receive the 3D printer minimum resolution capability of 10 microns (0.01 mm) and calculate that the total object height of 1.1 mm (1100 microns) is an even multiple of the 3D printer minimum height resolution, by dividing the total object height of 1100 microns by the printer resolution of 10 microns. This may result in an even 110 number of layers of height 0.01 mm (10 microns) that would print the 1.1 mm object with zero total object height error. Printing 110 layers, each at a 0.01 mm height, may take a substantial amount of time to complete. However, dividing the 1.1 mm total object height by the selected 250-micron layer height results in 4.4 layers—not an even multiple of layers—so an adjustment to the selected global layer height is warranted.

Any adjustment to the global layer height that is an even multiple of the minimum printer resolution may be used to produce the object with a total height that has no errors. One iterative technique for determining the global layer height nearest to the selected layer height of 250 microns, is to successively divide the total object height (1100 microns) by the selected layer height (250 microns) plus or minus a multiple of the printer's minimum height resolution (10 microns) until the result is a whole number of layers. For example, dividing 1100 by 240 microns yields 4.58333 layers; dividing by 230 microns yields 4.7826 layers; dividing by 220 microns yields exactly 5 layers. In this example, the technique determines that a global layer height of 220 microns, equivalent to 88% of the selected value, is closest to the selected layer height and will result in a printed object whose total height is as specified in the associated 3D model with no error. Similarly, for a 3D model having a total object height of 1.05 mm and tolerance of +0/−30 microns, with a fine mode (0.200 mm) selected, following the same technique for adjusting layer heights, it can be determined that the model may be sliced using a global layer height adjusted to 210 microns (5% above that selected) to reproduce the objects total height in 5 layers with no error.

Techniques for determining global layer heights of 3D models having total object heights and tolerances to be printed on printers of resolution capabilities that may not evenly divide into the total object height value, may section global layers into one or more layer subsets that may employ linear or curve fit adjustments in subset layer heights to achieve the best object height accuracy. This technique is similar to that discussed in reference to Table 1 for adjusting and compensating layer heights to accurately reproduce local height features, except that layer height adjustments to accurately reproduce the total object height may not require the compensating layer height changes that local height feature techniques require.

In the example described above, positive user preference error, or error associated with one or more height configuration parameters may be favored over negative user preference error. This may be accomplished by weighting total object height or printing error with a factor X and user preference error with a factor Y, with a specific bias towards positive user preference error, such as printing at a higher resolution than selected by the user. It should be appreciated that other weighting or selecting schemes or algorithms are contemplated herein. For example, in one aspect, machine learning techniques may be employed to track user selections (e.g., associated with a single user, tracked via login information, a single 3D printer, or multiple users and/or 3D printers) and revisions to 3D printing projects. The user selections may be aggregated over time to modify the default settings that may be automatically entered by the slicer 165. In some instances, machine learning may be used at least in part to modify biases applied to the selection algorithm, such that certain error ranges may be acceptable to a specific user or specific 3D printer, but not to other users or printers. In this scenario, the factors X and Y may be selected or modified according to tracked and aggregated user preferences/selections.

In some cases, collected data that relate to user selections, such as the "Click to fit" UI feature described above, may be used as training data for machine learning processes. In one example, every time a user selects a "Fit this" or other similar selection item associated with a Z-axis feature, the selection and data associated therewith may be added to a training set. A machine learning algorithm (such as a generic machine learning algorithm) may be trained and validated on this data such that it recognizes the best feature in any new object that the user prints. In this scenario, the 3D modeling application or UI may automatically indicate or suggest which z-axis features to preserve or associate with a higher or specific tolerance or accuracy, based on historic user selection data/the training data, thus reducing the steps required by a user to configure 3D modeling/printing of an object.

Figure 7:
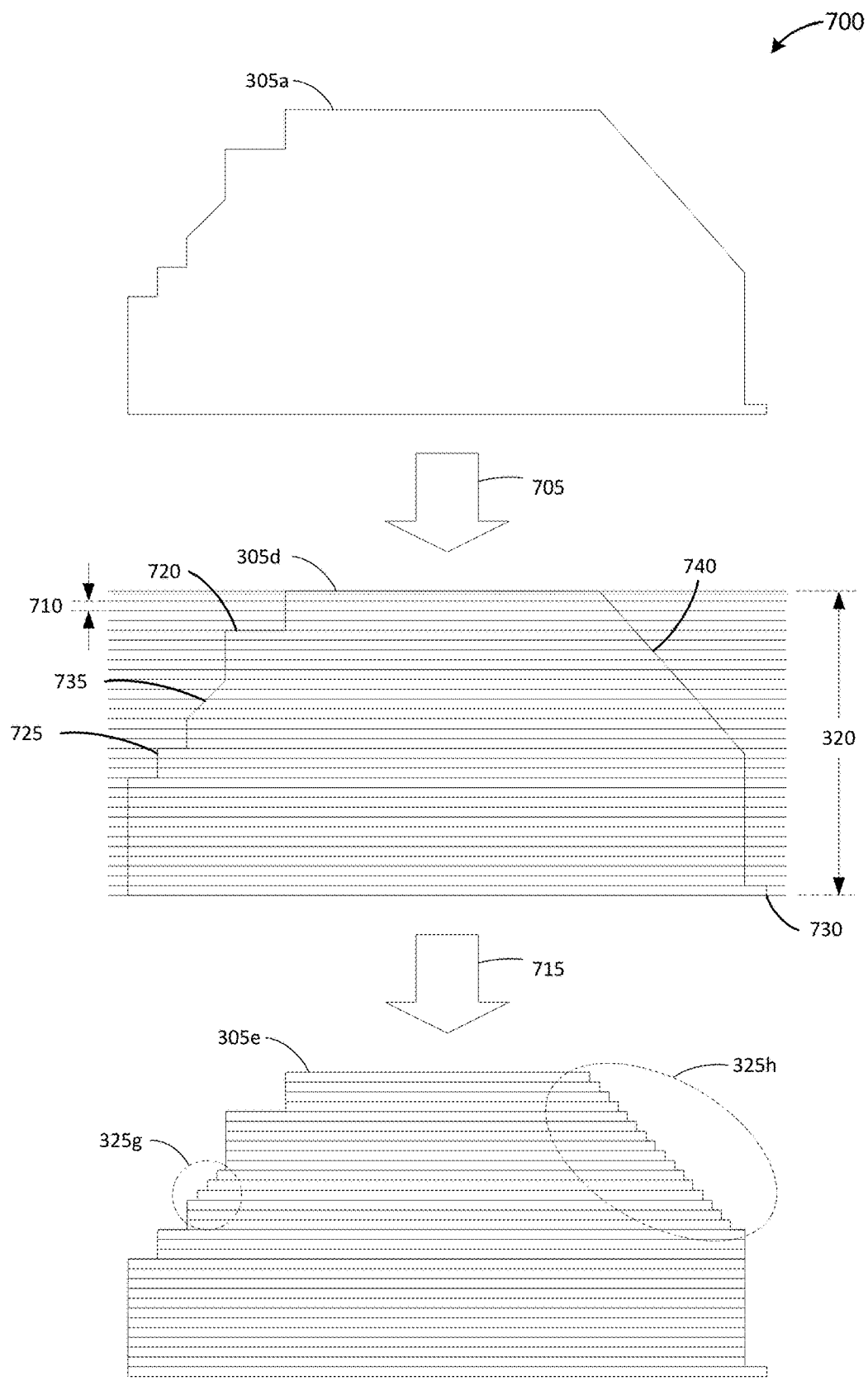
FIG. 7 depicts an example process for segmenting an object into layers by a slicer associated with a 3D printer according to the operational procedure of FIGS. 4 and/or 6.

FIG. 7 depicts an example process 700 for segmenting an object 305, previously described in reference to FIG. 3, into layers by a slicer associated with a 3D printer according to the operational procedures 400, 500, and/or 600 described in reference to FIGS. 4, 5 and/or 6 above.

Process 700 may begin with a global layer height being selected for printing 3D object 305a at 705, based on the total object height 320, and one or more height configuration parameters, for example, according to operations 402 and 404, operations 502-510, and/or procedure 600. Layer height 710 may be selected to equal a multiple of the total object height 320, and to conform to one or more height configurator parameters (e.g., a minimum and/or maximum layer resolution or step size, a specified layer height, and tolerance values for certain z-dimensional features of 3D object 305, such as stepped portions 720, 725, and 730, and slopped portions 735 and 740). Operation 705 may result in slicing the object 305d into a number of layers having a thickness 710. The sliced object 305d may then be printed at operation 715 to produce object 305e. Thickness or layer height 710 may be selected to be a multiple of the total object height 320, and so may result in no total object height error. Layer height 710 may also be selected to minimize any z-dimensional error, such as errors present in process 300, such as errors 325a, 325c, and 325f. In addition, layer height 710 may result in reduced errors in sloped portions of the 3D object 305, such that errors 325g and 325h are less than errors 325b and 325e associated with process 300.

Figure 8:
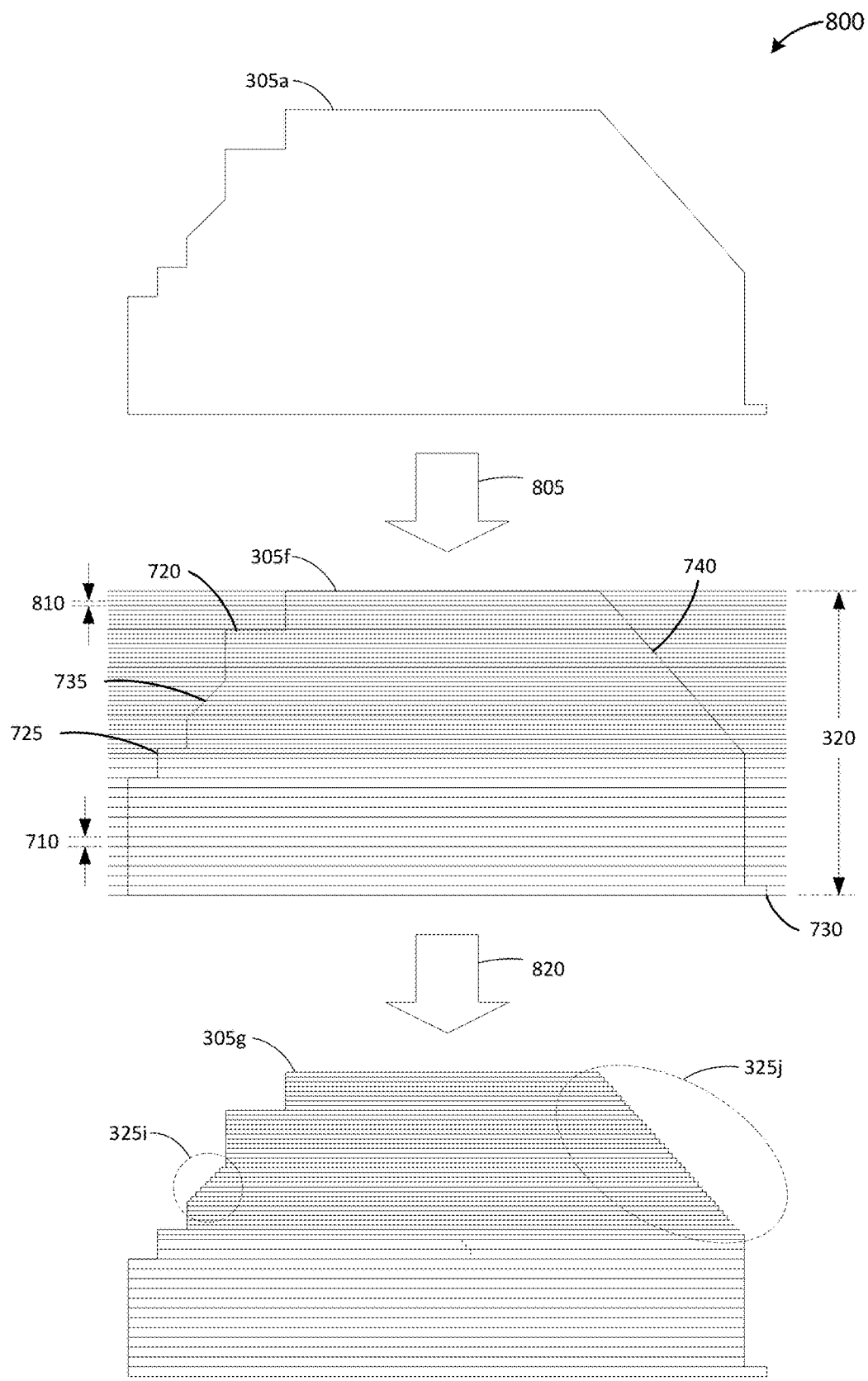
FIG. 8 depicts an example process for segmenting an object into layers by a slicer associated with a 3D printer according to the operational procedure of FIG. 4, 5, or 6.

FIG. 8 illustrates an example process 800 for segmenting an object into layers by a slicer associated with a 3D printer according to the operational procedure of FIGS. 4, 5, and/or 6.

Process 800 may begin with a global layer height being selected for printing 3D object 305 at 805, based on the total object height 320, and one or more height configuration parameters, for example, according to operations 402 and 404, operations 502-514, and/or procedure 600. Layer height 710 may be selected to equal a multiple of the total object height 320, and to conform to one or more height configurator parameters (e.g., a minimum and/or maximum layer resolution or step size, a specified layer height, and tolerance values for certain z-dimensional features of 3D object 305, such as stepped portions 720, 725, and 730). In some cases, the errors associated with sloped portions 735 and 740 present when using a single and global layer height 710, as illustrated in FIG. 7 as errors 325g and 325h, may not be acceptable or within a specified error range. In this circumstance, local layer height optimization may be used, also indicated by 805, to select a second layer height 810 (e.g., half of layer height 710 in the illustrated example) to reduce the errors present in portions 735 and 740, for example, according to operations 508 and 510. In this way, when the sliced 3D object 305f is printed at 820, errors 325i and 325j associated with sloped portions 735 and 740 of object 305g may be reduced.

Figure 9A:
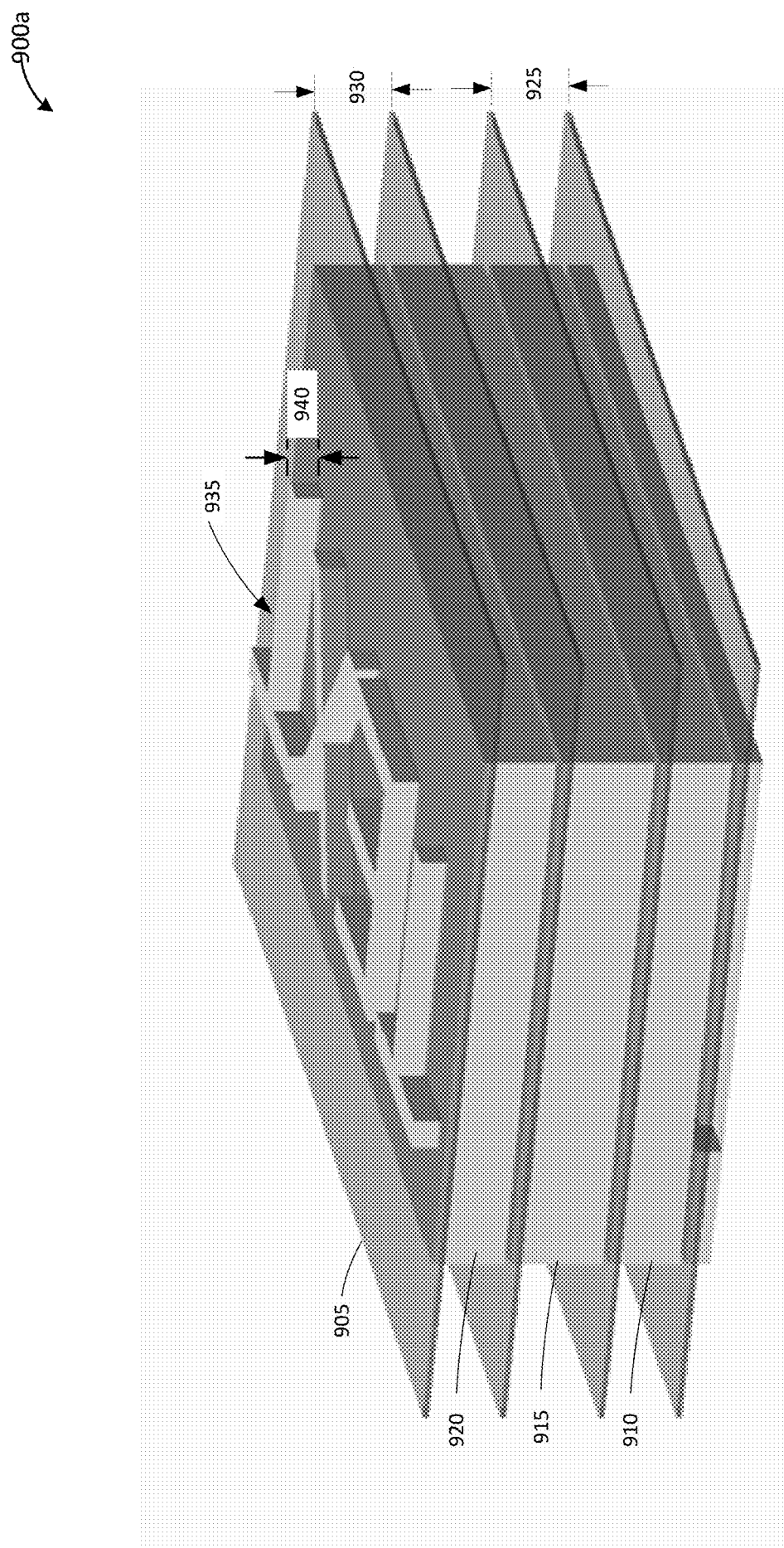
FIGS. 9A and 9B depict example perspective views of a 3D object having certain z-axis features located in-between layers of the 3D object.
Figure 9B:
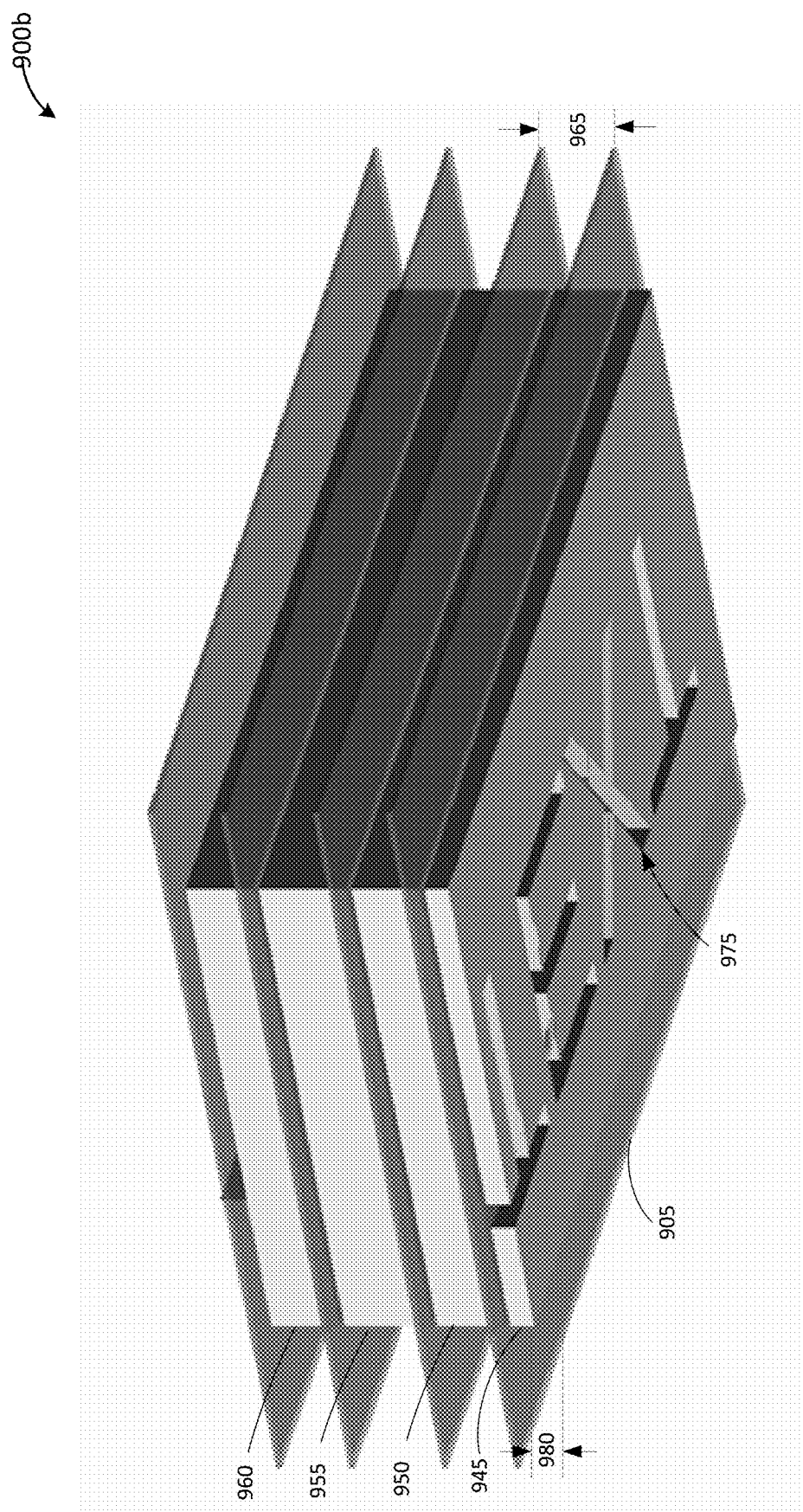

FIGS. 9A and 9B illustrate examples of specific z-axis features of a 3D object 900a and 900b that may be modeled and/or printed with greater accuracy using the described techniques. With reference to FIG. 9A illustrating a top view of 3D object 900a, 3D object 300 is sliced into 4 layers, 910, 915, 920, and 935 by planes 905. The top layer 935 includes text having a certain height 940, such as embossed text, which may be less than a global layer height 925, of layers 910 and 915. In order to model and/or 3D print accurately the embossed text 935, the height 930 of layer 920 may be adjusted (e.g., in this case, reduced), according to the techniques described above, in order to enable a 3D printer with a specific minimum height resolution to print accurately embossed text 935 having a height 940. With traditional techniques for slicing a 3D model, such as 3D model 900a, features such as embossing features on the top (illustrated from the bottom perspective in FIG. 9B) of the object, may be completely lost in a fixed layer height approach, such as if the height 940 of the feature is less than half of a global or fixed layer height 925. In one example, when the top or bottom layer has a fine feature, such as text embossing, the described techniques may include adjusting the layer height of the particular layer and/or one or more proximate layers, such as layer 920, to that maximize accuracy of the specific feature height. In some cases, the height of other layers may be kept constant, thus preserving the perceptual uniformity on the sides of the object but also improving speed by not having to adjust each layer height individually. This technique can be applied to intermediary layers as well, by splitting one layer into two layers, or by adjusting two layers equally.

FIG. 9B illustrates another example bottom perspective view of 3D object 900b. 3D object 900b, as shown is sliced into five layers, 975, 945, 950, 955, and 960 by planes 905, for example, to be printed in reverse. The bottom layer 975 includes subtractive text having a certain height/depth 980, which may be less than a global layer height 965, of layers 945, 950, 955, and 960. In order to model and/or 3D print accurately the subtractive embossed text 975, the height 980 of layer containing text 975 may be adjusted (e.g., in this case, reduced), according to the techniques described above, in order to enable a 3D printer with a specific minimum height resolution to print accurately embossed text 975 having a height 980.

Figure 10:
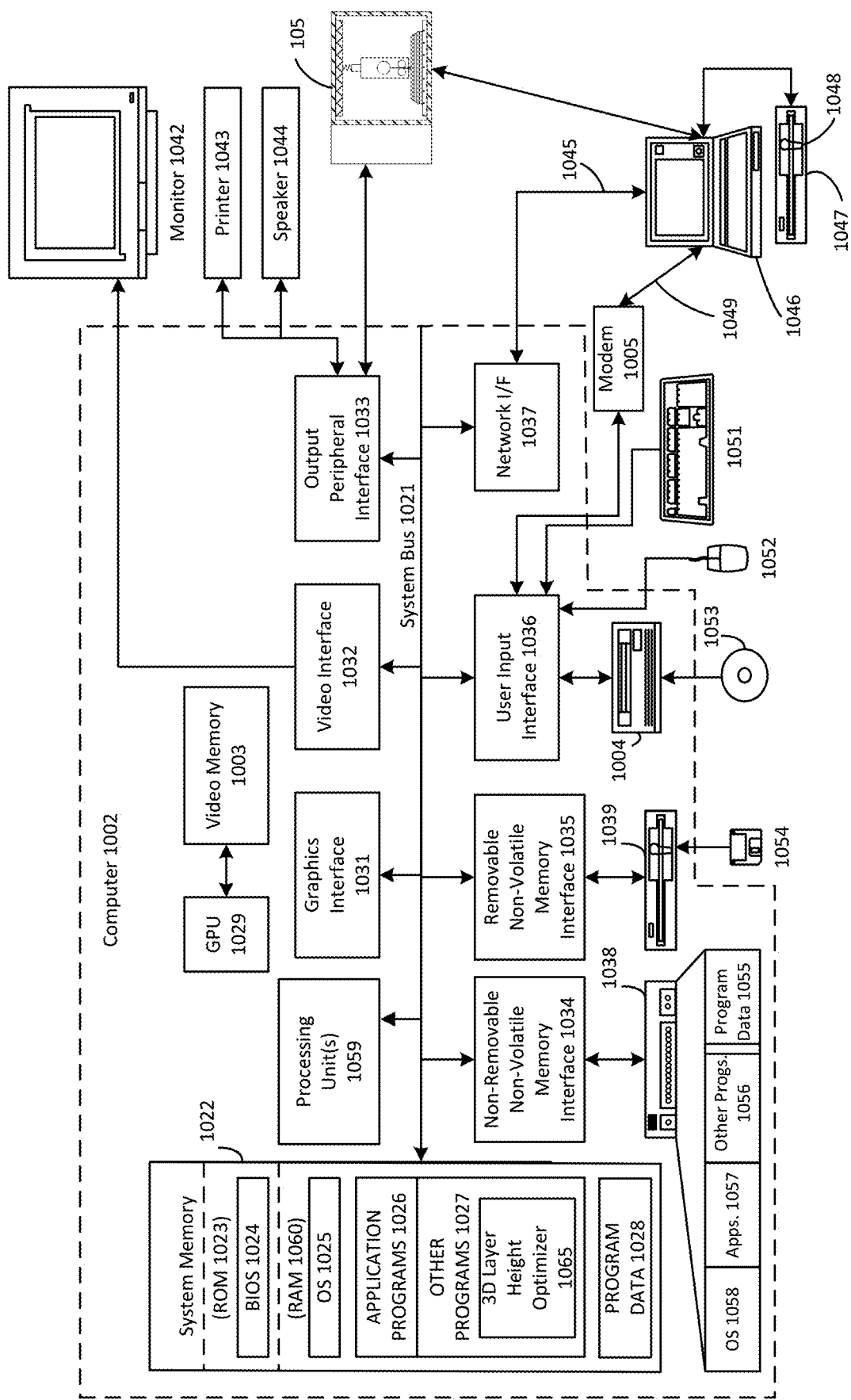
FIG. 10 depicts an example general purpose computing environment in which the techniques described herein may be embodied.

The 3D object layer height selection techniques described above, and/or the slicer/driver 165 and any associated user interfaces may be implemented on one or more computing devices or environments, as described below. FIG. 10 depicts an example general purpose computing environment, for example, that may include computing device 110, in which in which some of the techniques described herein may be embodied. The computing system environment 1002 is only one example of a suitable computing environment and is not intended to suggest any limitation as to the scope of use or functionality of the presently disclosed subject matter. Neither should the computing environment 1002 be interpreted as having any dependency or requirement relating to any one or combination of components illustrated in the example operating environment 1002. In some embodiments the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 1002, which may include any of a mobile device or smart phone, tablet, laptop, desktop computer, or collection of networked devices, cloud computing resources, etc., typically includes a variety of computer-readable media. Computer-readable media can be any available media that can be accessed by computer 1002 and includes both volatile and nonvolatile media, removable and non-removable media. The system memory 1022 includes computer-readable storage media in the form of volatile and/or nonvolatile memory such as read only memory (ROM) 1023 and random access memory (RAM) 1060. A basic input/output system 1024 (BIOS), containing the basic routines that help to transfer information between elements within computer 1002, such as during start-up, is typically stored in ROM 1023. RAM 1060 typically contains data and/or program modules that are immediately accessible to and/or presently being operated on by processing unit 1059. By way of example, and not limitation, FIG. 10 illustrates operating system 1025, application programs 1026, other program modules 1027 including a 3D layer height optimizer 1065, and program data 1028.

The computer 1002 may also include other removable/non-removable, volatile/nonvolatile computer storage media. By way of example only, FIG. 10 illustrates a hard disk drive 1038 that reads from or writes to non-removable, nonvolatile magnetic media, a magnetic disk drive 1039 that reads from or writes to a removable, nonvolatile magnetic disk 1054, and an optical disk drive 1004 that reads from or writes to a removable, nonvolatile optical disk 1053 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1038 is typically connected to the system bus 1021 through a non-removable memory interface such as interface 1034, and magnetic disk drive 1039 and optical disk drive 1004 are typically connected to the system bus 1021 by a removable memory interface, such as interface 1035 or 1036.

The drives and their associated computer storage media discussed above and illustrated in FIG. 10, provide storage of computer-readable instructions, data structures, program modules and other data for the computer 1002. In FIG. 10, for example, hard disk drive 1038 is illustrated as storing operating system 1058, application programs 1057, other program modules 1056, and program data 1055. Note that these components can either be the same as or different from operating system 1025, application programs 1026, other program modules 1027, and program data 1028. Operating system 1058, application programs 1057, other program modules 1056, and program data 1055 are given different numbers here to illustrate that, at a minimum, they are different copies. A user may enter commands and information into the computer 1002 through input devices such as a keyboard 1051 and pointing device 1052, commonly referred to as a mouse, trackball or touch pad. Other input devices (not shown) may include a microphone, joystick, game pad, satellite dish, scanner, retinal scanner, or the like. These and other input devices are often connected to the processing unit 1059 through a user input interface 1036 that is coupled to the system bus 1021, but may be connected by other interface and bus structures, such as a parallel port, game port or a universal serial bus (USB). A monitor 1042 or other type of display device is also connected to the system bus 1021 via an interface, such as a video interface 1032. In addition to the monitor, computers may also include other peripheral output devices such as speakers 1044 and printer 1043, such as a 3D printer 105, which may be connected through an output peripheral interface 1033.

The computer 1002 may operate in a networked environment using logical connections to one or more remote computers, such as a remote computer 1046. The remote computer 1046 may be a personal computer, a server, a router, a network PC, a peer device or other common network node, and typically includes many or all of the elements described above relative to the computer 1002, although only a memory storage device 1047 has been illustrated in FIG. 10. The logical connections depicted in FIG. 10 include a local area network (LAN) 1045 and a wide area network (WAN) 1049, but may also include other networks. Such networking environments are commonplace in offices, enterprise-wide computer networks, intranets, the Internet, and cloud computing resources.

When used in a LAN networking environment, the computer 1002 is connected to the LAN 1045 through a network interface or adapter 1037. When used in a WAN networking environment, the computer 1002 typically includes a modem 1005 or other means for establishing communications over the WAN 1049, such as the Internet. The modem 1005, which may be internal or external, may be connected to the system bus 1021 via the user input interface 1036, or other appropriate mechanism. In a networked environment, program modules depicted relative to the computer 1002, or portions thereof, may be stored in the remote memory storage device. By way of example, and not limitation, FIG. 10 illustrates remote application programs 1048 as residing on memory device 1047. It will be appreciated that the network connections shown are example and other means of establishing a communications link between the computers may be used.

In some aspects, other programs 1027 may include a 3D layer height optimizer application 1065 that includes the functionality as described above, such as in or associated with a 3D printer slicer or driver 165. In some cases, the 3D layer height optimizer application 1065/slicer 165 may execute some or all operations of processes 400, 500, 600, and/or 800, and provide a user interface, as described above, through graphics interface 1031, video interface 1032, output peripheral interface 1033, and/or one or more monitors or touch screen devices 1042. In some aspects, the 3D layer height optimizer application 1065/slicer 16 may communicate with 3D printer 105 to produce a physical 3D object of the 3D image data, as described above. In some aspects, other programs 1027 may include one or more 3D virtualization applications that may obtain and provide images that may be displayed of sliced 3D models generated by 3D layer height optimizer application 1065/slicer 165.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. For purposes of this specification and the claims, the phrase "computer-readable storage medium" and variations thereof, does not include waves, signals, and/or other transitory and/or intangible communication media. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for generating tool-path instructions to produce a three-dimensional (3D) object with high dimensional accuracy, the system comprising:
   a processor; and
   a memory comprising instructions that, when executed by the processor, cause the system to:
   access a 3D model of the 3D object to be produced, wherein the 3D model comprises at least one feature and a plurality of layers;
   determining a height configuration parameter accuracy error;
   selecting a global slice layer height based on the height configuration parameter accuracy error, wherein each of the plurality of layers has a global slice layer height;
   adjust a layer height of at least one of the plurality of layers based on the feature and a total object height of the 3D model, wherein the adjusted layer height is different from the global slice layer height, and wherein the adjusted layer height is selected to optimize an accuracy of the total object height of the 3D model; and
   generate, based on the global slice layer height and the adjusted layer height, tool-path instructions for use by a device to produce the 3D object.

2. The system of claim 1, wherein the instructions, when executed by the processor, further cause the system to:
   determine an object height accuracy error for the 3D object; and
   select the global slice layer height based on the object height accuracy error.

3. The system of claim 2, wherein a first received height configuration parameter comprises a tolerance corresponding to a subset of the plurality of layers.

4. The system of claim 3, wherein a second received height configuration parameter is the total object height, wherein the instructions further cause the system to:
   select a slice layer height for the subset of the plurality of layers based on the first received height configuration parameter and the total object height, wherein the slice layer height is selected to optimize accuracy the plurality of height configuration parameters and the total object height.

5. A method for generating tool-path instructions to produce a 3 dimensional (3D) object, the method comprising:
   accessing a 3D model of the 3D object to be produced, wherein the 3D model comprises at least one feature and a plurality of layers;
   determining a height configuration parameter accuracy error;
   selecting a global slice layer height based on the height configuration parameter accuracy error, wherein each of the plurality of layers has a global slice layer height;
   adjusting a layer height of at least one of the plurality of layers based on the feature and a total object height of the 3D model, wherein the adjusted layer height is different from the global slice layer height, and wherein the adjusted layer height is selected to optimize an accuracy of the total object height of the 3D model; and
   generating, based on the global slice layer height and the adjusted layer height, tool-path instructions for use by a device to produce the 3D object.

6. The method of claim 5, further comprising receiving at least one height configuration parameter comprising the global slice layer height for the plurality of layers.

7. The method of claim 6, wherein the global slice layer height is based on a total height of the object.

8. The method of claim 6, wherein the at least one height configuration parameter comprises a tolerance for a subset of the plurality of layers.

9. The method of claim 8, further comprising:
   identifying one or more layers of the plurality of layers associated with the tolerance; and
   selecting at least one of a number of layers of the plurality of layers to correspond to a second height based on the tolerance.

10. The method of claim 9, wherein identifying the one or more layers comprises receiving a selection of at least one first tolerance and at least one formable layer corresponding to the at least one first tolerance.

11. The method of claim 6, wherein the at least one height configuration parameter comprises a tolerance for a subset of the plurality of layers, and wherein the method further comprises:

adjusting a second layer height of at least one of the plurality of layers based on the tolerance.

12. The method of claim 6, wherein the at least one height configuration parameter comprises an object height resolution, further comprising:

selecting the global slice layer height to meet or exceed the object height resolution.

13. The method of claim 5, further comprising:

determining an object height accuracy error for the 3D object; and selecting the global slice layer height based on a comparison of the object height accuracy error and the height configuration parameter accuracy error.

14. The method of claim 13, wherein selecting the global slice layer height further comprises:

weighting the height configuration parameter accuracy error relative to the object height accuracy error.

15. The method of claim 13, wherein selecting the global slice layer height is biased towards a positive height configuration parameter accuracy error.

16. The method of claim 5, further comprising selecting a bottom formable layer height separately from global slice layer height to ensure bottom layer adhesion.

17. A computer readable storage device having stored thereon instructions that, upon execution by at least one processor, cause the at least one processor to perform operations for generating tool-path instructions to produce a three dimensional (3D) object, the operations comprising:

accessing a 3D model of the 3D object to be produced, wherein the 3D model comprises at least one feature and a plurality of layers;

determining a height configuration parameter accuracy error;

selecting a global slice layer height based on the height configuration parameter accuracy error, wherein each of the plurality of layers has a global slice layer height;

adjusting a layer height of at least one of the plurality of layers based on the feature and a total object height of the 3D model, wherein the adjusted layer height is different from the global slice layer height, and wherein the adjusted layer height is selected to optimize an accuracy of the total object height of the 3D model; and generating, based on the global slice layer height and the adjusted layer height, tool-path instructions for use by a device to produce the 3D object.

18. The computer readable storage device of claim 17, wherein operations further comprise receiving at least one height configuration parameter comprising a 3D printer resolution selection or the global slice layer height.

19. The computer readable storage device of claim 17, wherein a layer comprising the global slice layer height is a first thickness and a layer comprising the adjusted layer height is a second thickness that is different than the first thickness.

20. The computer readable storage device of claim 19, wherein the operations further comprise selecting a height corresponding to at least the subset of the plurality of layers based on the received at least one height configuration parameter and the total object height, wherein the height is selected to optimize accuracy of the at least one height configuration parameter and the total object height.

* * * * *